United States Patent [19]

Grover et al.

[11] Patent Number: 5,023,869
[45] Date of Patent: Jun. 11, 1991

[54] METHOD AND APPARATUS FOR MAXIMIZING THE TRANSMISSION CAPACITY OF A MULTI-CHANNEL BIDIRECTIONAL COMMUNICATIONS LINK

[75] Inventors: Wayne D. Grover; Tommy Fong, both of Edmonton; Joe P. Dubuc, Sherwood Park; Witold A. Krzymien, Edmonton; George D. Fraser, Sherwood Park, all of Canada

[73] Assignee: Alberta Telecommunications Research Centre, Edmonton, Canada

[21] Appl. No.: 329,271

[22] Filed: Mar. 27, 1989

[51] Int. Cl.[5] ............................ H04J 3/22; H04J 3/12
[52] U.S. Cl. ...................................... 370/84; 370/118; 370/13
[58] Field of Search ............... 370/84, 13, 118; 375/7, 375/8, 10

[56] References Cited

U.S. PATENT DOCUMENTS 4,756,007  7/1988  Qureshi et al. ...................... 370/84
4,802,189  1/1989  Wedler .................................. 370/84

FOREIGN PATENT DOCUMENTS 0112953 12/1982  European Pat. Off. .............. 370/84

OTHER PUBLICATIONS

Bingham, John A. C., The Theory and Practice of Modem Design, Wiley Interscience.
Ohashi et al., *Development of a Variable Rate Syndrome Sequential Decoder Based on a Stack Algorithm*, Globecom 1988.
Otani et al., *Development of Variable-Rate Digital Modem for Digital Satellite Communication Systems*, Globecom 1988.
Kamisaka et al., *A Digital Modulator VLSI Covering Various Modulation Techniques and Wide Range Data Speeds*, Globecom 1988.
Stuber et al., An Adaptive Rate Algorithm for FH/BFSK Signaling, IEEE Transactions on Communications, vol. 36, No. 12, Dec. 1988.
Maseng, Torleiv and Trandem, Odd, *Adaptive Digital Phase Modulation*, Nordic NTA Proceedings, Oct. 14–16, 1986.
Literature and Patent Search for ATRC "Turbo-Loop", project, Conducted on Apr. 22, 1988 by Erick Eid, Ven-Tel Pathfinder 18K brochure.

*Primary Examiner*—Douglas W. Olms
*Assistant Examiner*—Min Jung
*Attorney, Agent, or Firm*—Hayes, Soloway, Hennessey & Hage

[57] ABSTRACT

A method for determining the highest, common bi-directional transmission rate between two stations of an ISDN communications link includes the steps of a) selecting a candidate transmission rate from a range of candidate transmission rates, b) transmitting a test signal at the candidate transmission rate through an attenuator along the link from one of the stations to the other of the stations for a first predetermined time interval, c) determining whether a return signal transmitted by the other station over the link and at the candidate transmission rate has been correctly received at the one station, d) repeating steps a), b) and c) until predetermined criteria have been satisfied; and e) storing the highest candidate transmission rate for which a return signal at that rate was correctly received within the first time interval; and f) removing the attenuator for final verification of operation.

18 Claims, 8 Drawing Sheets

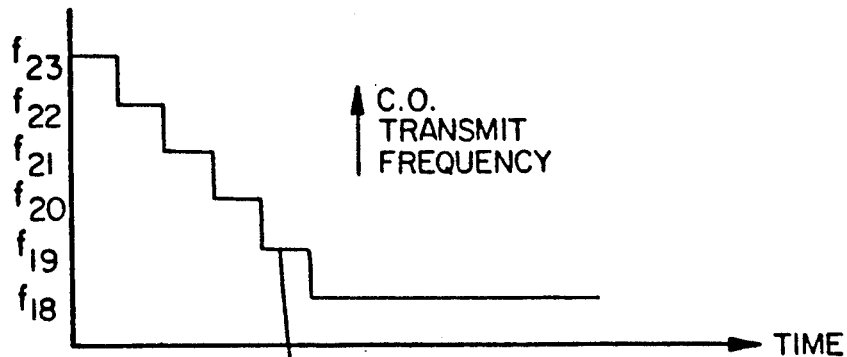
FIG. 3a
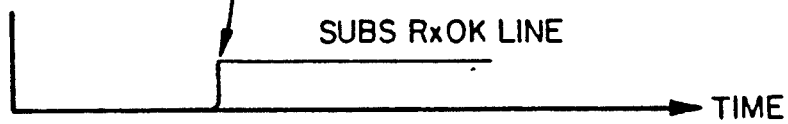
FIG. 3b
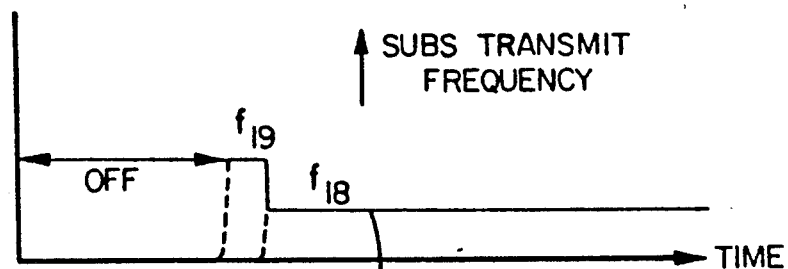
FIG. 3c
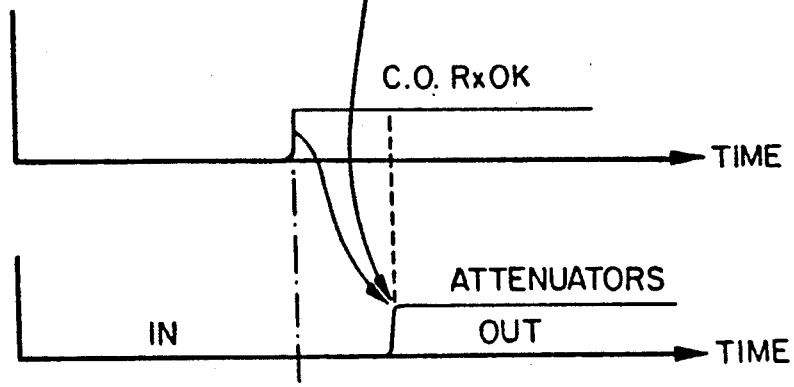
FIG. 3d
FIG. 3e

METHOD AND APPARATUS FOR MAXIMIZING THE TRANSMISSION CAPACITY OF A MULTI-CHANNEL BIDIRECTIONAL COMMUNICATIONS LINK

The present invention relates to a method and apparatus for determining the highest, common bi-directional transmission rate for continuous transmission systems which provide high speed, low Bit Error Rate (BER), true circuit services such as in Integrated Services Digital Network (ISDN) communications systems.

BACKGROUND OF THE INVENTION

ISDN standards organizations, equipment vendors, and operating companies have generally accepted 5.5 km as the target reach for normal 2B+D basic rate ISDN access service. 5.5 km is a reasonable distance accommodation because (a) it is achievable by signal processing methods which are feasible with prevailing VLSI decision feedback equalization, echo cancellation, and line coding methods using only four signal levels without using sequence estimation techniques, (b) it is a good match to subscriber demography in that most (typically, more than 97%) of all subscribers are within 5.5 km of a central office, and (c) it is compatible with past line loading practice in that, generally, loops shorter than 5.5 km are not inductively loaded and, therefore, are upgradable to digital transmission without the need of removing loading coils. Beyond 5.5 km, loading coils are more common, sharply increasing the cost of a digital subscriber loop installation.

While the industry presently plans to offer fixed 2B+D and 23B+D transmission rates, technology is capable of transmission at intermediate transmission rates. Indeed, it can be shown that, in principle, if one has a technology that achieves bandwidth-limited 2B+D transmission over a 5.5 km loop (f3dB approx. 9 KHz), then the same base technology could support approximately 22B+D transmission over a 1 Km loop (f3db around 200 KHz). There are many business subscribers in a city core who are well under 5.5 km from a Central Office and who could benefit from service capacity between the 2B and 23B limits. ISDN technology and methods are particularly well suited to potentially providing a flexible bandwidth because one D channel can manage the signalling for a varying number of B channels. Prior to the onset of ISDN, it would have been impractical to consider this type of service because there was no workable manner of managing and flexibly exploiting the extra capacity which could be achieved for a subscriber on a short loop, as opposed to a long loop, because of the previous non-channelized, in-band signalling protocols. The ISDN access format is, by comparison, well suited to deal flexibly with different numbers of B-channels for each subscriber or to deal with applications where basic access services are provided to a number of customers over one physical wire pair such as in multi-tenant business buildings, apartment buildings, PBX to Central Office trunk groups. This would make it possible for a telephone company to offer an individual subscriber an mB+D service where "m" is as high as the least of either the capacity requested by the subscriber or the physical transmission limit of the specific loop.

The difficulty with offering this service is that, heretofore, it would be necessary to measure every subscriber loop copper pair to determine the highest theoretical service capacity the loop could support, different interface rate cards would be required for each such rate, and records of the different services would have to be maintained. There is a need therefore for an apparatus and an automatic transmission rate adaptation process for easily and quickly determining the highest, safe bi-directional transmission rate for any given loop and automatically entering service at the rate.

Traditionally, in transmission design of any sort, including conventional ISDN, a bit-rate is determined for a given service and then all efforts focus on the technology to transmit that bit rate the greatest possible distance under the worst feasible conditions. Whereas designers of modems and data transmission applications frequently use buffers, queuing and statistical multiplexing concepts and varying effective transmission rates, in the world of engineering of true circuit transmission services, changing transmission capacities or buffering are considered extremely objectionable properties for a transmission system. Throughout the literature and in experience of the classical circuit transmission engineering, the bit rate is the one "given" parameter; it is the main requirement of the design. The classical challenge is to meet the target bit rate over the maximum distance possible. Thus, the suggestion of changing the bit rate adaptively as a means of ensuring the required BER performance or reach would normally not be acceptable.

However, the recent ISDN context presents thousands (i.e. each subscriber's loop) of individual transmission design problems where it is the length of each loop that is fixed and digital formats sharing common D-channel signalling methods can manage an arbitrary amount of bearer channels simultaneously. Notwithstanding this opportunity, the industry has so far focused exclusively on providing selected fixed transmission rates (144 kb/s, 800 kb/s, 1.544 Mb/s) and hopes to achieve the maximum possible reach for each such bit rate. However, because the length of any one loop is fixed, theoretical reach maximization at fixed bit rates is of no benefit to the vast majority of individual applications.

Looking to conventional methods of transmission rate selection, it is known to estimate a potential transmission rate by impulse response characterization. Thus, given the objective of operating at the highest reasonable transmission rate over an unknown transmission path, it would be obvious to one skilled in the art of digital transmission to use impulse response testing to determine the transfer function of an unknown transmission path and then select a transmission rate that is known to be within workable limits for given coding, modulation and receiver circuit implementation. Use of this approach could in principle take two forms: (a) explicit manual impulse response characterization, followed by setting and verifying the transmission rate or (b) automatic pulsing of the path by the transmitter at one end and corresponding numerical sampling of the impulse response of the line by the receiver at the other end to thereby deduce the transfer fucntion as a means to determining the operating transmission rate.

These methods suffer from a number of drawbacks. Method (a) requires manual involvement and is objectionable for this reason. Neither method (a) nor method (b) directly determines the highest bi-directional rate at which the loop will operate because the impulse response is only related in principle to the potential transmission capacity. Factors such as noise, crosstalk, nonlinearity are not taken into account by these methods unless they are also measured separately. Even then, the determination of the highest safe operating rate is not based on direct verification of transmission rates by actual transmission but rather it is based on data acquisition and subsequent theory-based calculations of the expected transmission performance. Both methods also require that impulse response data, and/or other measurements taken at each end, be exchanged between ends so that the adopted transmission rate is the lowest of the two rates determined to be feasible for the two independent directions of transmission. Both methods require significant extra circuit components for the impulse-response stimuli and data acquisition process that are instrumentation-quality linear subsystems and are not a normal part of the transceiver for its operating phase.

Some data modem designs provide transmission rate selection and optimizing techniques. However, these achieve only unidirectional rate measurement or adaptation and/or apply only in the context of data transmission applications where data may be buffered and system control information may be substituted therein whenever required. This is not accepted when providing continuous, uninterrupted customer circuit service to an application, such as in an ISDN environment.

One modem design is commonly known as the "autobaud" modem which allows a host computer to deduce the transmission rate received from a data terminal when that terminal logs on. An agreed to character symbol (determined by convention prior to the use of the system, for instance the letter "o") is transmitted by the modem at the terminal which is logging on. To determine the data rate at which the terminal will transmit during the session, the host receiver simply oversamples the received waveform and, knowing that it is the agreed character, can thereby determine the transmission rate of the data bits from the remote terminal.

Another modem design technique is the method of apparent transmission rate maximization through data compression. The word "apparent" is used because the actual physical symbol transmission rate is not altered. Rather, through source encoding means, which extract redundancy from the source messages, such as by means of partial Huffman encoding, the sending modem replaces only a limited subset of commonly repeated patterns in the data with a special symbol so that the number of symbols of transmission for a given amount of source information is reduce. The receiving modem performs the reverse expansion. In these schemes for data transmission, ACK/NACK (acknowledgement) information is also available from the other end so that the transmitting end is aware of dropping throughput should this occur. Given this measure of channel throughput, it possible to set a criterion at which the extra delay for source encoding (e.g. converting uncoded symbols to less redundant transmission symbols based on Huffman tables of symbol frequency) has a net advantage in effective throughput through the impaired channel. In such schemes however, the physical baud rate of transmission is not actually changed.

Another modem method of transmission rate adjustment is applicable to data transmission but not to continuous transmission systems which provide high speed, low BER, constant delay circuit services. In a data transmission application, error detection information is fed back to the transmitter so it knows the success rate of message transmission continually while in operation. In any case where such information is available, it is a simple matter for a modem to adjust by reducing its transmission rate in half. Many commercial modems "fall back" to 4800, 2400 or 1200 b/s and remain there for the duration of a call if they encounter excessively frequent NACK indications.

A recent variation on this technique but which differs from the present invention is employed in the Ven-Tel Pathfinder (trade mark) 18K modem. This modem uses 18 individually modulated subcarriers straddling the voice frequency transmission band. The modem measures the carrier strengths over the actual connections and, on this basis, classifies each carrier as to its goodness for data transmission (i.e. its strength through the actual channel). When speed reductions are necessary, this modem falls-back in 100 b/s increments by disusing the weakest carriers. When conditions improve, carriers that return to the required strength can be re-entered into service with an increase in overall transmission rate.

The Pathfinder modem application is, again, a "data" application in which continuous transmission feedback is provided and wherein it is possible to change the transmission rate while in service. In ISDN applications, the bearer circuit-service cannot be interrupted, even temporarily, while in service because voice traffic is carried. In addition, multi-carrier channelization FDM methods, as used by the Pathfinder modem, are less efficient and more complex in circuitry than baseband methods of transmission for digital subscriber loop application. Since a Digital Signal Processing (DSP) chip is probably used to perform the power measurement and multi-channel filtering, modulation and demodulation functions in the Pathfinder, the pathfinder method is not presently technologically suited to a scheme which transmits adaptively at rates up to 1.544 Mb/s (rather than 18 kb/s) in both directions. The DSP chip will not be viable for such applications at these rates in the forseable future. The Pathfinder modem method requires processing of signal spectra which are no higher than the edge of the voiceband (4 to 6 KHz) and so numerical DSP is feasible for that application.

The Pathfinder modem method does not provide a true circuit service to the application such as is needed for voice communications in both directions (i.e. once a 64 kb/s stream is said to be available to an application on a circuit basis, the control protocol can never thereafter step in and reduce this amount or even buffer the application's bits temporarily to interrupt with its own control bits), it does not (as far as is disclosed) incorporate a guaranteed working power-margin after adaptation, it does not inherently result in operation at the highest common bidirectional transmission rate as is required in ISDN applications, and the Pathfinder adaptation approach does not apply in situations where it is desired to use baseband transmission methods to implement the technology.

SUMMARY OF THE INVENTION

The present invention seeks to provide an apparatus and a method for determining, in situ, the highest, common bi-directional transmission rate for any given telephone subscriber loop for continuous transmission systems having high speed, low BER, constant delay circuit services without the need for prior distance measurements, keeping of records or equipment engineering and is capable of doing so using only the minimum of circuit elements that are not strictly required during the entire normal operating life of the transmission system and that which is required in excess is capable of realization with very low incremental cost.

In accordance with one aspect of the present invention, there is provided an interface circuit for use in a multi-channel, continuous, baseband transmission system in which communication signals may be transmitted bi-directionally over a communications link between two stations of the system, the interface circuit comprising receiver means, having a receiver input and a receiver output, for delivering a signal applied to the receiver input to the receiver output, transmitter means, having a transmitter input and a transmitter output, for delivering a signal received at the transmitter input to the transmitter output for transmission along the link to the other station and control means for controlling the mode of operation of the interface circuit wherein the interface circuit is operable in a NORMAL mode in which signals applied to the transmitter input are delivered by the transmitter means to the transmitter output for transmission along the link to the other station and signals received from the link at the receiver input and acquired by the receiver means are delivered to the receiver output, and wherein the interface circuit is operable in a transmission rate ADAPTATION mode in which, in response to a first predetermined condition, the control means is operable to initiate a transmission rate testing process and subsequent thereto to restore the interface circuit for operation in the NORMAL mode of operation at the highest operable, bi-directional transmission rate determined pursuant to the testing process, or, in response to a second predetermined condition, the control means is responsive to a transmission rate testing process initiated at the other station and subsequent thereto to restore the interface circuit for operation in the NORMAL mode of operation at the highest operable, bi-directional transmission rate determined pursuant to the testing process.

In accordance with another aspect of the present invention, there is provided a method for determining the highest, common bi-directional transmission rate between two stations of an ISDN communications link, the method comprising the steps of (a) selecting a candidate transmission rate from a range of candidate transmission rates, (b) transmitting a test signal at the candidate transmission rate along the link from one of the stations to the other of the stations for a first predetermined time interval through an artificial margin-reserving attenuator, (c) determining whether a return signal transmitted by the other station over the link and at the candidate transmission rate has been correctly received at the one station, (d) repeating steps (a), (b) and (c) until predetermined criteria have been satisfied; and (e) storing the highest candidate transmission rate for which a return signal at that rate was correctly received within the first time interval and nf) transmitting for final verification without the artificial attenuator.

BRIEF DESCRIPTION OF THE DRAWINGS

These and other features of the invention will become more apparent from the following description in which reference is made to the appended drawings wherein:

FIG. 3a is a graph of frequency as a function of time of the test signals transmitted by the ORIGINATOR during a linear downstepping frequency search;

FIG. 3b is a graph of the status of the RxOK line of the RESPONDER receiver during a linear downstepping frequency search;

FIG. 3c is a graph of frequency as a function of time of the RESPONDERs transmitter during a linear downstepping frequency search;

FIG. 3d is a graph, similar to FIG. 3b, but illustrating the status of the RxOK line of the ORIGINATOR receiver during a linear downstepping frequency search; and FIG. 3e is a graph illustrating the status of the input and output attenuators during a linear downstepping frequency search;

DESCRIPTION OF PREFERRED EMBODIMENT

Figure 1:
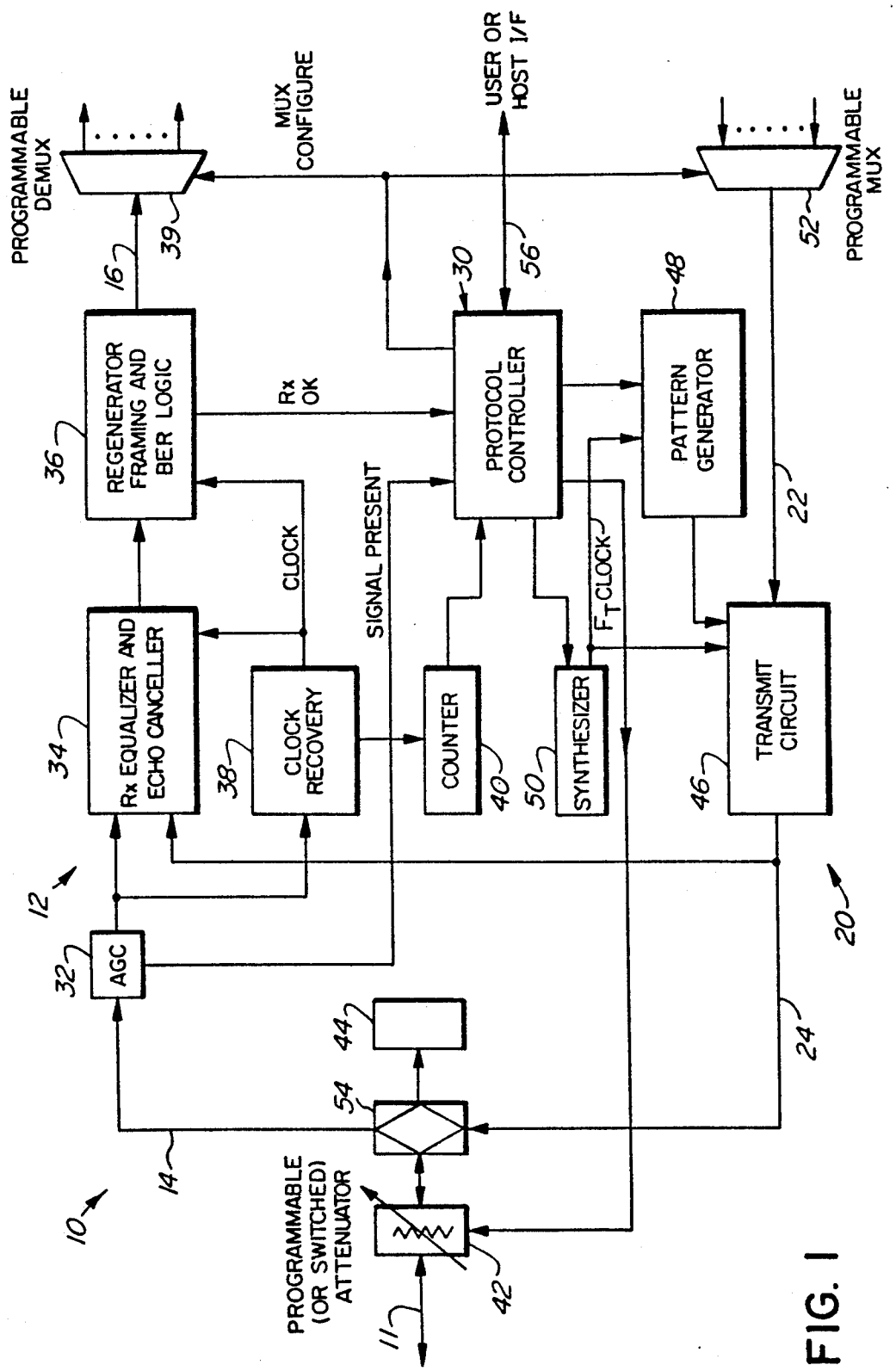
FIG. 1 is a block diagram representation of a preferred embodiment of an interface circuit according to the present invention.

FIG. 1 illustrates a preferred embodiment of the interface circuit 10 of the present invention for use in a multi-channel digital communication system used in a continuous, baseband transmission system in which communication signals are transmitted bi-directionally over a two-wire subscriber loop pair 11 between two stations of the system. Identical interface circuits 10 are provided at each station and, accordingly, it will be understood that the description which follows is applicable to both stations.

The interface circuit comprises receiver means 12, having a receiver input 14 and a receiver output 16, for delivering a signal applied to the receiver input to the receiver output, transmitter means 20, having a transmitter input 22 and a transmitter output 24, for delivering a signal received at the transmitter input to the transmitter output for transmission along the transmission link to the other station, and control means 30, also referred to herein as protocol controller, for controlling the operation of the interface circuit.

Receiver means 12, as shown in FIG. 1 wherein a two wire to four wire conversion hybrid 54 is used, would normally also include an adaptive echo canceller function as is known in the present art for operation at the fixed rate of 144 kb/s. In the present invention the receive adaptive equalizer, and echo canceller if present, are functionally equivalent to the present art for fixed rate systems but as a subpart here of a larger system to determine the operating rate adaptively, they are necessarily augmented with the capability to do their basic function over any of the operating frequencies envisaged in the system. If a two wire to four wire conversion 54 is not used, then the same system operates without the need of the echo canceller function and two separate copper twisted pair are used in place of the one pair 11 shown. In the two wire case, transmission is bidirectional over one balanced pair of wires. In the so-called four wire case, all of the same principles apply but one pair of wires is used separately for each direction of transmission shown at 11.

Interface circuit 10 has two basic modes of operation. The circuit usually operates in a NORMAL mode in which multichannel signals applied to transmitter input 22 are delivered to transmitter output 24 for transmission along the link to the other station while signals received from along the link at receiver input 14 and acquired by the receiver means are delivered to receiver output 16. When it is desired to adapt the communications link so that it operates at its highest, common, bi-directional transmission rate, the circuit 10 at one of the stations is made to operate in a transmission rate ADAPTATION mode. This is achieved by applying an appropriate signal to control means 30 of that station. This causes that circuit to assume an originator role in which it initiates a transmission rate testing process which, as explained below, results in the determination of the highest, safe transmission rate for the specific transmission link. At the end of the process, control means 30 restores its associated interface circuit 10 to its NORMAL operating mode but at the transmission rate determined pursuant to the testing process and configures the input mux 39 and output mux 52 to enable the number of individual subchannels which correspond to the adapted transmission speed at 11.

In response to test signals and other line conditions such as the temporary absence of a signal altogether, initiated by the first station, the control means at the other station also enters the ADAPTATION mode but assumes a responder role in which it cooperates with the originator to determine the highest, safe transmission rate. Upon completion of this process, it also restores its associated interface circuit to its NORMAL mode of operation at the transmission rate determined pursuant to the testing process.

Receiver means 12 includes an automatic gain control (AGC) 32 responsive to a signal applied to the receiver input for delivering a "signal present" output signal to the control means and means for acquiring a signal applied to the receiver input and delivering a "signal acquired" (later referred to as RxOK) signal to the control means. The acquiring means includes an adaptive equalizer circuit 34 (with possible echo canceller as discussed earlier) for receiving and converging on a signal delivered to it by AGC 32, a signal evaluation circuit, in the form of a Regenerator, Framing and BER Logic circuit 36, for subjecting a signal delivered by the equalizer circuit to predetermined criteria and delivering a "signal acquired" signal to the control means when the criteria are satisfied. The receiver also includes clock recovery circuit 38 for determining the clock of a received signal delivered to it by AGC 32 and delivering the clock to the equalizer circuit and the evaluation circuit. A programmable demultiplexer 39 is provided for demultiplexing a signal acquired by the signal evaluation circuit means during the NORMAL mode of operation. A symbol frequency counter or analyzer 40 is operative to determine and store the currently received transmission rate. A switchable or programmable variable attenuator 42 is included for attenuating a signal applied to the receiver input and/or transmitter output during a portion of the ADAPTATION mode in order to provide a safe transmission rate operating margin as explained more fully later. It will be understood by those skilled in the art that switchable attenuator 42, as shown in the case of FIG. 1 with 2W/4W hybrid 54, has the effect of attenuating both receive and transmit signals due to the bidirectional nature of 11, in this case. In the so called 4W (four wire) case, switchable attenuator 42 is preferably only applied to the transmit output path 24, although the method can without any basic deviation envisage use of switched attenuators on both transmit and receive copper pairs in the case of 4W operation.

The transmitter path is comprised of a controllable output attenuator 42 operable, during the ADAPTATION mode, under the control of the control means 30 for attenuating a transmitted signal, a transmit encoding logic means and line driving circuit 46 operable over a range of transmission rates, a pattern generator 48 and a synthesizer 50 for producing test signals and line states during the ADAPTATION mode, and a programmable input multiplexer 52 operable in the NORMAL mode for delivering to the transmitter input signals to be transmitted over the link to the other station. Circuit 10 as drawn is provided with a 2W to 4W hybrid circuit 54 but as discussed direct 4W operation is possible without any significant change in the following principles of operation. Except for controller 30, all of the components of the circuit are well known in the art and, accordingly, are not described in further detail herein except to say that they must herein be capable of performing their functions over a range of clock frequencies. Controller 30 may take the form of a microprocessor or like integrated circuit into which the adaptation logic/control protocol may be programmed or built. Balance impedance 44 is simply a normal complex impedance network required to maximize the trans-hybrid loss of the 2W/4W converter 54.

OPERATION

FIGS. 2, 3, 4 and 5 illustrate the circuit structure and the control protocol for the adaptation process of the present invention. FIGS. 2a and 4a are Finite State Machine (FSM) illustrations of two embodiments of the logic adopted by the end which originates the adaptation process and FIGS. 2b and 4b illustrate the corresponding logic adopted by the responding end in the adaptation process. The overall adaptation process that results from the interaction of the two state machines of FIGS. 2a and 2b is illustrated in FIG. 3 and described hereinbelow.

The adaptation method of the present invention is applied only during installation or subsequent brief periods of time where the link can be taken out of service. In all cases, the adaptation phase is intended to be followed by an relatively long period of multi-channel, in-service operation. The adaptation method may be used in applications where the link remains energized (transmitting idle pattern), during periods of non-utilization (no calls in progress) and in applications where the link is de-energizing for power and component stress reduction when not in service. In de-energizing applications, the link design will have previous adaptation process operating parameters stored in battery backup RAM (not shown) which contains the last working bit rate for the link.

During NORMAL operation (box 60 in FIG. 2a), the transmitting station powers up and operates at previously used settings, for which it is assumed transmission is viable, and continues transmitting at that rate. In response, the receiving station re-energizes and transmits back at the same previous working frequency and, because the receiving frequency does not change or shift away from this frequency, controller 30 of the receiving station accepts this rate of operation and stays in the NORMAL operating state (box 62 in FIG. 2b) implicitly using the previous operating settings.

The ADAPTATION process may be initiated by either end of the transmission line by transmitting a command (box 64 in FIG. 2a), discussed later, to the controller at one of the stations along User/Host interface line 56. Whichever end does so will assume the role of ORIGINATOR and the other end will assume the role of RESPONDER. At the beginning of the process, if the ORIGINATORs transmitter is in an operating state (box 60), the controller shuts it off for a period of time and then returns it to an active state indicated at box 70. If the transmitter is already off (box 68), then it proceeds directly to the next stage of the process indicated at box 70. As explained more fully below, acting as the ORIGINATOR in a true procedure to re-optimize the link, it then conducts a frequency search by transmitting a series of signals at different transmission rates, each for a predetermined period of time, until some previously determined condition is met such as either the highest bi-directional transmission rate has been determined or all candidate frequencies have been tested. This condition is a function of the nature of the frequency search implemented into the control means and will become apparent as the description proceeds.

The RESPONDER obeys the same rules as for the start-up of a normal call, but because it detects a frequency shift or change in the received signal following a "signal absent" condition at its receiver input, it is compelled by the logic in the protocol controller to cooperate with the ORIGINATOR in seeking a new operating frequency before entering the NORMAL operating state.

Two techniques for searching out the highest safe bidirectional operating rate are described herein. The first and simpler method is called "linear downstepping". It is used in the following initial description of the principle operation of the present invention. This is followed by a description of a slightly more complicated "modified binary section frequency search" method. From these descriptions, it will become apparent to those skilled in this art that several variations on the searching strategy are possible without departing from the spirit of the invention and that the invention is not limited to any frequency search strategy.

If the ORIGINATOR goes from a de-energized line to a transmitting state for the purposes of executing the adaptation process, the ORIGINATOR will switch its transmitter on, switch in attenuator 42 and start a timer1. It then transmits a pseudo-random (or other) data pattern, originating from pattern generator 48, at the maximum rate used in the system such as, for example, 1.5 Mb/s corresponding to 23B+D or at some other rate which can be specified in the adaptation command. The ORIGINATOR will transmit the test signal for a predetermined period of time and thereafter check for an RxOK signal at its receiver. The RxOK signal is produced by the ORIGINATORs receiver when it has successfully acquired a return signal from the RESPONDER. The above processes are illustrated in boxes 70-74 of FIG. 2a. FIG. 3a shows this initial transmission as $f_{23}$.

Figure 2A:
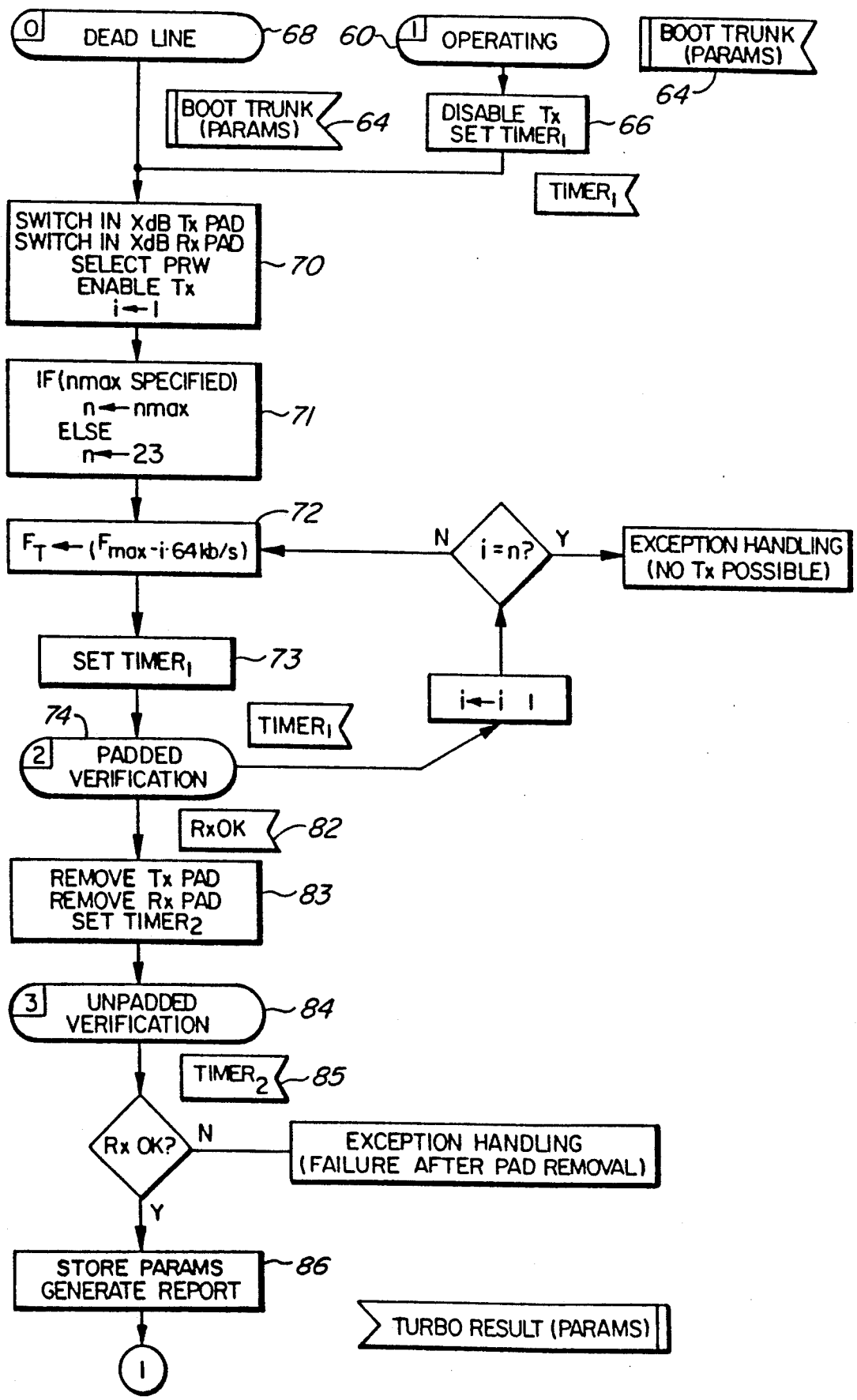
FIGS. 2a and 2b are Finite State Machine representations of the adaptation control protocol assumed by the ORIGINATOR and RESPONDER, respectively, in a linear downstepping frequency search adaptation process.
Figure 2B:
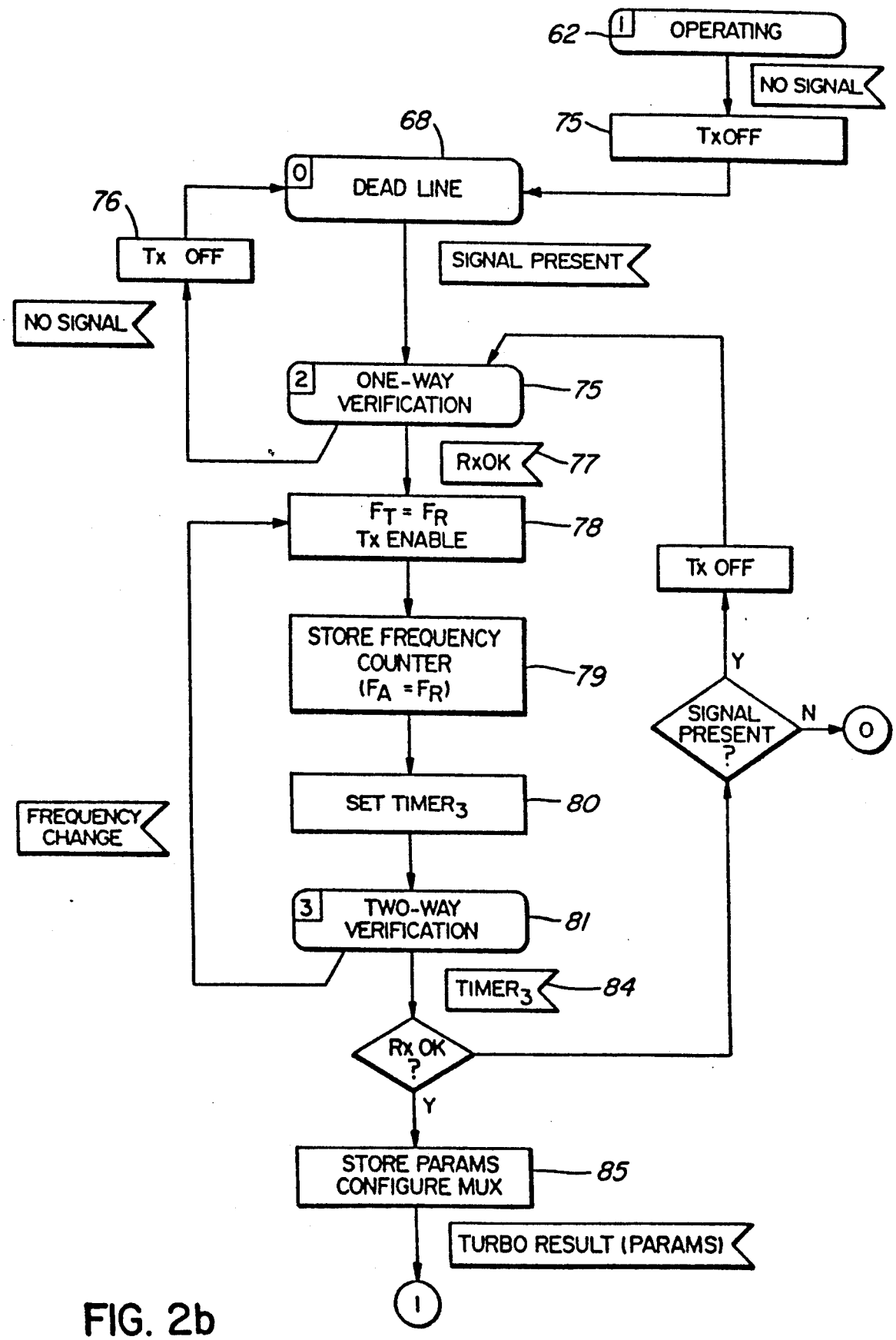

As indicated by box 75 in FIG. 2b, the RESPONDER interface circuit switches off its transmitter after detecting a "no signal" condition at its input and will not transmit anything until valid frame, error rate and any possibly eye-opening indications have been obtained in its receiver. When a "signal present" condition is detected by AGC 32, the RESPONDER will attempt to acquire or verify the signal (box 76). Thus, if 23B+D transmission is unsupportable on the subject link, the RESPONDERs receiver will not generate the internal conditions necessary to deliver an RxOK indication to its controller, no matter how long the ORIGINATOR transmits at 1.5 Mb/s, and will keep its transmitter off (box 76). In the present example, 23B+D ($f_{23}$) is not viable and therefore no return signal is transmitted by the RESPONDER. Consequently, the ORIGINATORs local receiver will likewise not generate an RxOK condition because it will not have received the required return signal.

If, after a pre-determined interval of waiting, determined by timer1, for success at the ORIGINATOR end, the ORIGINATORs receiver has not generated an RxOK signal, the ORIGINATORs controller causes the transmitter to step down in transmit frequency to the next lower transmission rate (as indicated by boxes 76, 77 and 72 in FIG. 2a), in this example to 22B+D rate, and again repeats the transmit, wait and test of its own RxOK status. This is shown as $f_{22}$ in FIG. 3a.

If transmission is possible at all over the subject link, the ORIGINATOR will eventually have stepped down to some frequency at which the RESPONDERs receiver can acquire the clock of and regenerate and decode the test signal and produce the receive conditions (BER and eye-margin) necessary to generate and deliver an internal RxOK signal (box 77) to its controller 30. As shown in FIG. 3b, this occurs in response to the $f_{19}$ test signal. The controller will then switch its transmitter on, as shown in FIG. 3c and set its transmit frequency to that of the currently received signal (box 78). In the meantime, counter 40 will have acquired and stored the received frequency (box 79). Finally, the RESPONDER will set time3 (box 80) and transmit a valid return signal at the same transmission rate as that of the test signal just received (as shown in FIG. 3c) so as to effect a two-way verification (box 81).

Similarly, the ORIGINATOR will eventually have stepped down to some frequency at which its own receiver comes into error-free operation, implying that, within the allotted time, it has successfully acquired the clock of and regenerated and decoded the RESPONDERs return signal and produced the receive conditions (BER and eye-margin) necessary to generate the RxOK signal. In the example of FIG. 3, this occurs at $f_{18}$ (see FIG. 3d). The above described process forms a downwards transmission rate stairstep as illustrated in FIG. 3a which stops when the RESPONDER receiver is able to acquire the test signal and the same criteria are also satisfied in the reverse direction of transmission at the same candidate transmission rate.

Having acquired the return signal, the ORIGINATOR then initiates an unpadded verification (box 84 in FIG. 2a and FIG. 3e) of the test signal after switching out the input and/or output attenuators (box 83) and retransmitting the test signal at the last successful candidate transmission rate for a predetermined time period illustrated by timer2 (box 85) in FIG. 2a.

If the RESPONDERs receiver remains acquired in two successive epochs defined by predetermined criteria in terms of either the duration of a local timer or symbol counter (timer3 box 84), and during the two successive epochs, there is no change in the value of the receive frequency counter or analyzer 40, then the RE- SPONDER enters a final waiting period of another such predetermined duration. If the frequency is unchanged and the receiver is acquired, then the final parameters are stored and the NORMAL operating state is entered (box 85) using transmission at the rate just found. Similarly, if a valid return signal is acquired by the ORIGINATORs receiver at the end of the time period specified by timer2, the ORIGINATORs controller delivers the final parameters to the host/user and enters the NORMAL operating mode (box 86) using transmission at the rate just found.

The ORIGINATOR-to-RESPONDER direction of transmission may not in general have the same transmission or noise characteristics as the RESPONDER-to-ORIGINATOR direction because of many factors including differing crosstalk and noise environments at the receivers, directional characteristics of 2W-4W hybrids, independent routing of circuit halves in 4W circuits, resistive and reactive impedance imbalances, an so forth. Therefore, the downstream direction may not work at some rate at which the upstream path does not work. In this case, the RxOK signal at the ORIGINATOR receiver will not go true for the rate even though the downstream link may be working fine. If it does not, the ORIGINATOR transmitter will simply continue stepping down in transmission rate, with predetermined waiting periods until, during one such transmit and wait interval, its own RxOK status is satisfied. This is illustrated in the example of FIG. 3 where, as indicated above, the RESPONDER was able to acquire the $f_{19}$ signal but the ORIGINATOR was not able to acquire the RESPONDERs corresponding return signal. Accordingly, the ORIGINATOR stepped down to $f_{18}$ and subsequently acquired the RESPONDERs return signal.

It can be seen that the nature of adaptation process of the present invention is such that when the RxOK condition arises in the ORIGINATORs receiver, the following conditions are by implication all satisfied: (a) RxOK exists in the RESPONDER receiver (the originator-to-responder transmission link is operating error free); (b) both ends are transmitting and receiving at the same transmission rate; (c) the rate is directly verified to be the highest common rate of successful transmission in upstream and downstream directions; and (d) the operating frequency corresponds to an integer number of B-channels, or other quantum unit of capacity on which the following search is based (most commonly this will be the basic sub-channel frequency, ie. for ISDN, either 64 kb/s (B channel multiples) or 16 kb/s (D-channel multiples) with freedom to arrange B+D multiples as desired.)

Without the use of attenuators during the frequency search phase of the adaptation process, the transmission link would be at the edge of its performance limits after adaptation. Accordingly, it could be hazardous to enter the NORMAL operating phase without attenuation as described above. Thus, the adaptation process provides a guaranteed reserve margin of signal power (X dB) by conducting the frequency search in the presence of attenuator 42 which is deliberately introduced prior to and removed after the search. An alternative to the use of attenuators for margin reservation is to conduct the adaptation process with hardware which provides the RxOK status indication only after an associated eye-opening monitor is satisfied. An eye-opening monitor is a circuit using two regenerative decision devices (not shown). One decision device uses a nominal decision threshold while the other uses an offset decision reference voltage. The reference voltage of the offset detector is controlled by a feedback loop which measures BER and forces the offset reference threshold to a value where an artificially high BER (say $10^{-3}$) results in the decision device. The voltage difference between the nominal threshold and the offset threshold is a direct electronic measure of eye-opening. While somewhat more complex than flat attenuators, the advantage of an eye-monitor is that the measure of operating margin it provides is a true measure of regenerator decision margin even if dispersion effects are significant, whereas the attenuator margin method strictly assures only a known power margin, which is not always directly related to BER margin unless a given system is known to be power limited, not frequency-distortion-limited.

The above description, based on linear downstepping, makes the principle of operation fairly clear. One advantage of the linear downstepping approach is that it is bound to find the highest possible rate even if non-monotonic BER vs. transmission rate characteristics exist. A disadvantage is that it requires relatively long times for adaptation if the final transmission rate is low, because it proceeds as a linear search. However, measured characteristics and physical principles suggest that cases where the transmission quality or margin does not monotonically decrease with the transmission rate should be quite infrequent. For the large number of cases for which this is true, the more efficient method of binary section can be used to search for the highest common rate (the threshold rate) at which transmission is acceptable.

Figure 4:
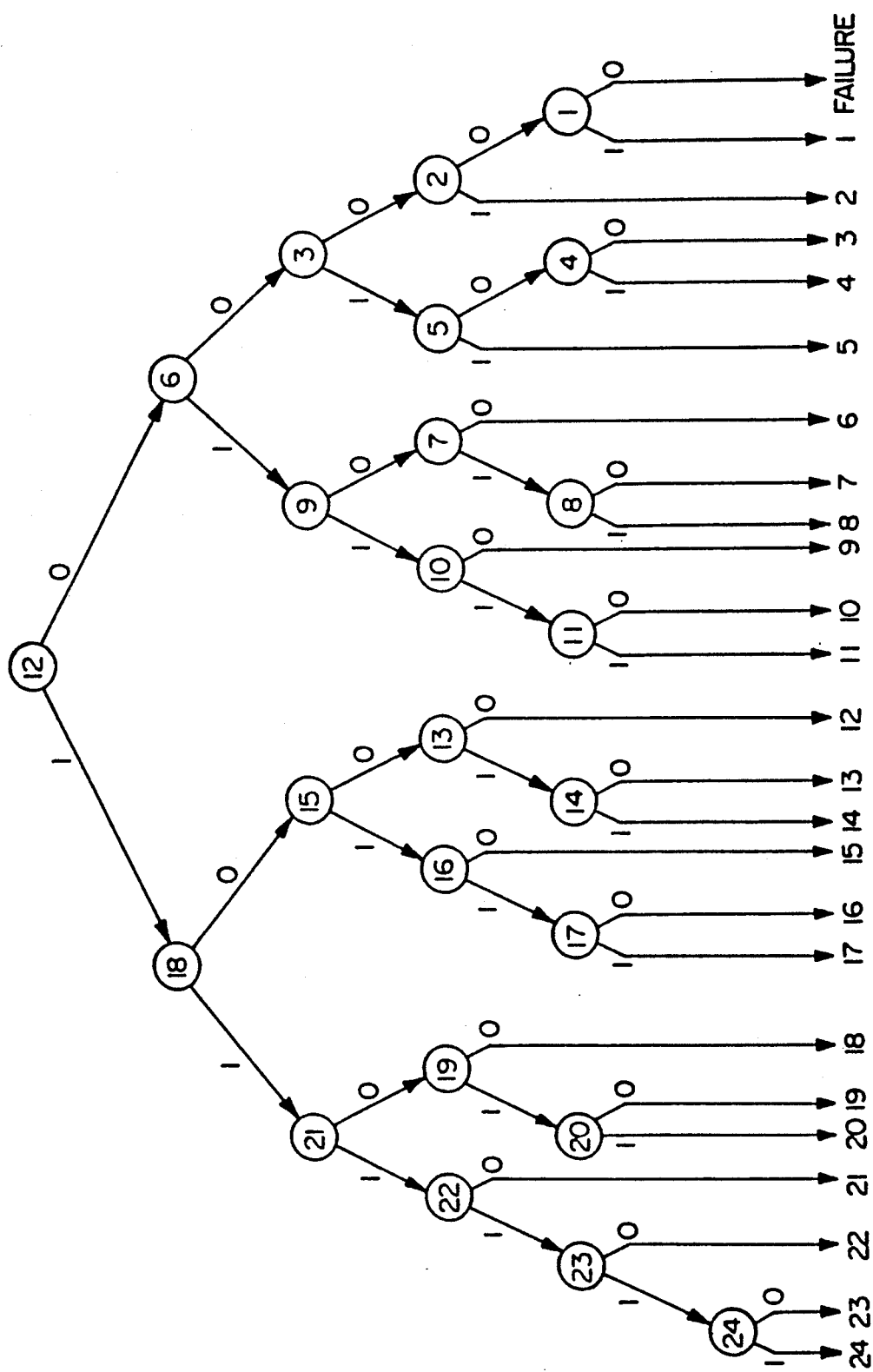
FIG. 4 is a graphical representation of the Binary Section frequency search routine according to a preferred embodiment of the present invention.
Figure 4A:
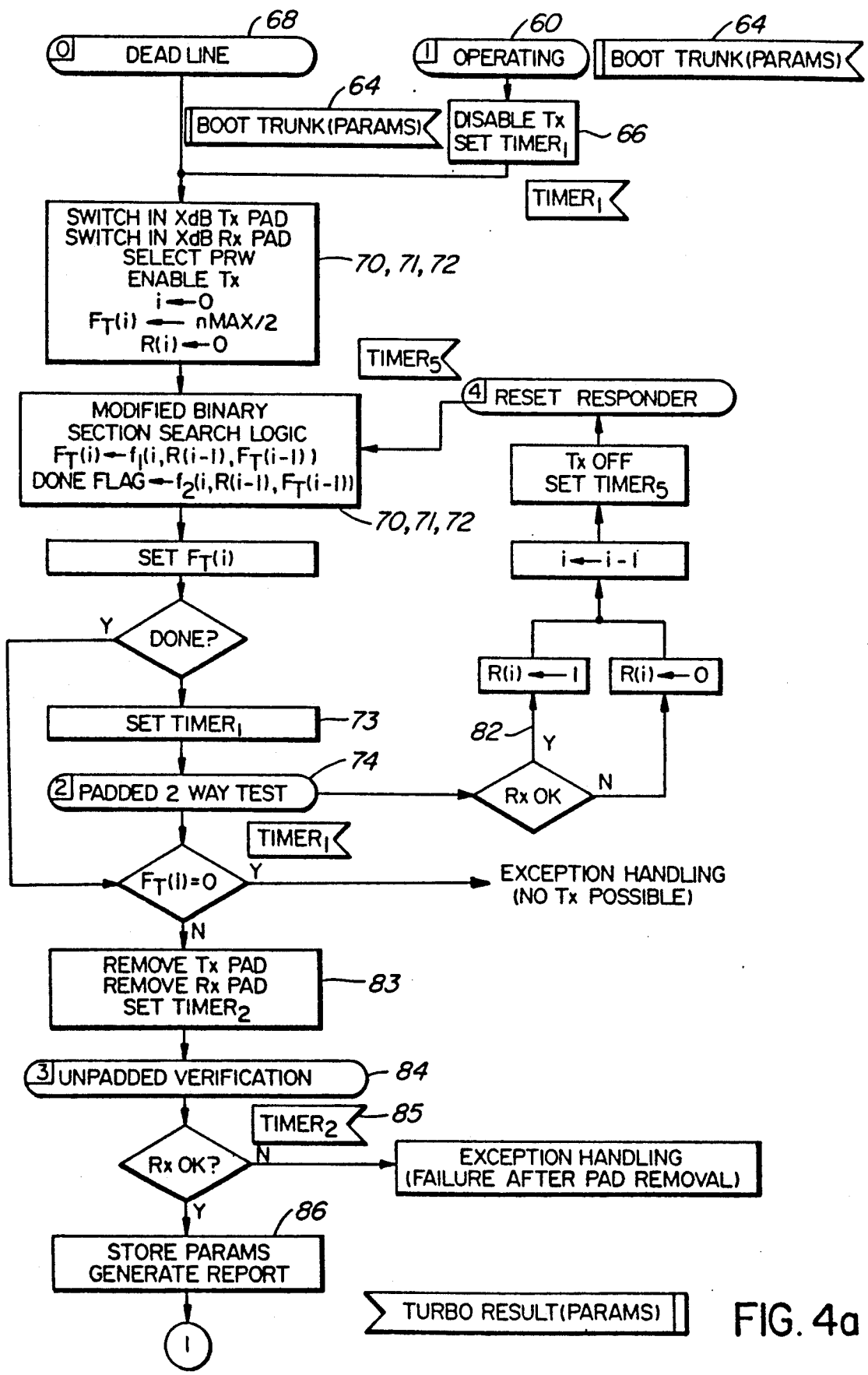
FIGS. 4a and 4b are Finite State Machine representations of the adaptation control protocol assumed by the ORIGINATOR and RESPONDER, respectively, in a Binary Section frequency search adaptation process.
Figure 4B:
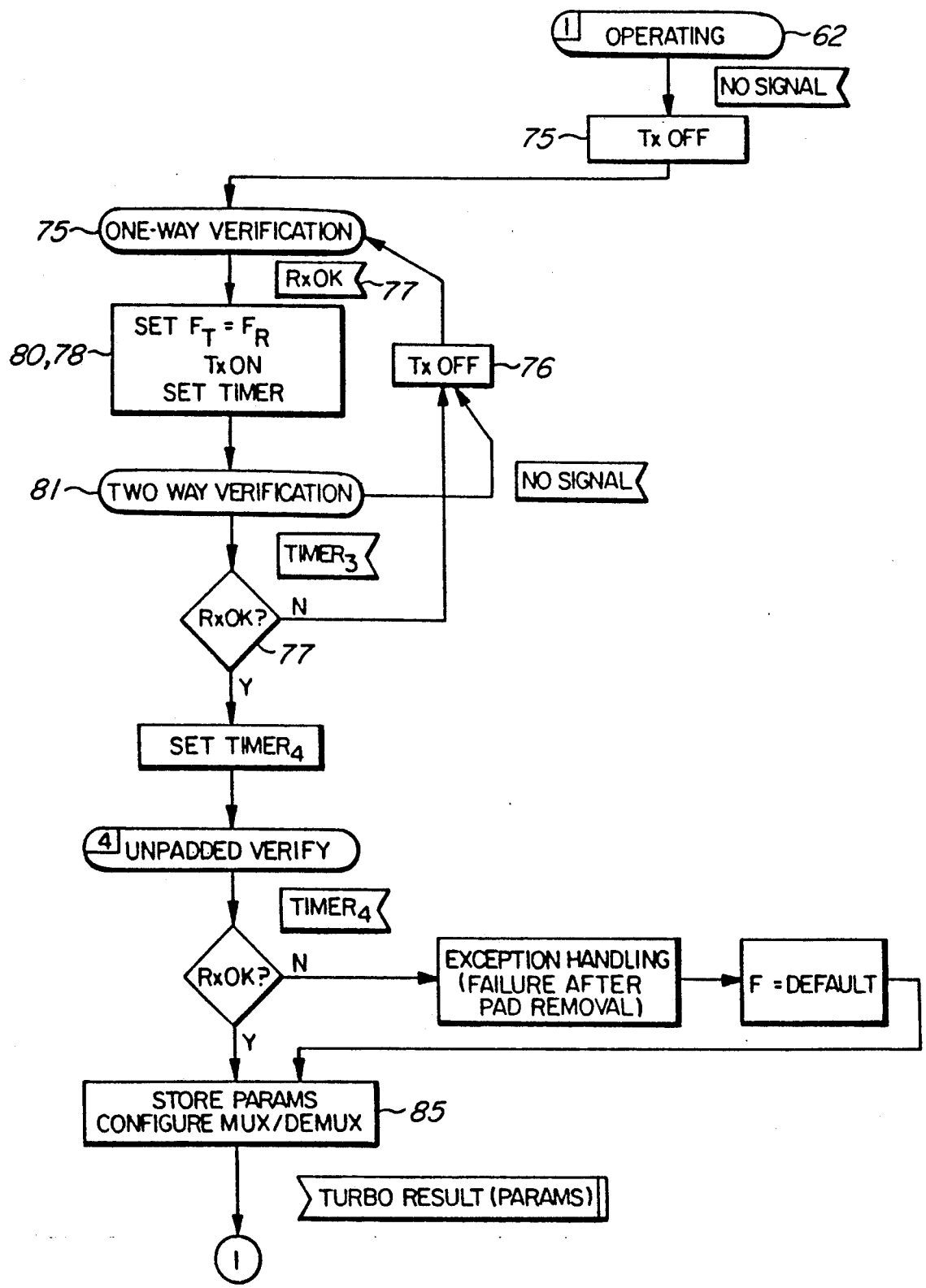

FIG. 4 illustrates a modified binary section search tree which can be used by the ORIGINATOR in place of the Linear Downstepping search procedure. Each circled number in the tree represents a candidate transmission rate. "1" indicates round-trip success at that rate; "0" indicates failure to observe RxOK within the specified waiting test time at the ORIGINATOR.

Thus, for the system of the linear downstepping example of FIG. 3 where the maximum transmission rate was 18B+D, the corresponding binary section process would operate as follows. A first test signal would be transmitted at a rate of 12B+D. This signal would be acquired by the RESPONDER receiver and the return signal would be acquired by the ORIGINATOR receiver. The ORIGINATOR would then transmit a second signal at 18B+D. Again, success would be achieved at both ends. Accordingly, the ORIGINATOR would transmit a third signal at 21B+D but his time neither end would produce the RxOK signal within the allotted time. Thus, the ORIGINATOR would step down to the 19B+D rate. At this rate, the RESPONDER would acquire the test signal but the ORIGINATOR would not acquire the return signal, as in the earlier example. The logic at both ends would indicate that the highest operating rate is 18B+D and would communicate this to their respective higher applications along line 56.

It will be seen that the tree forms a rule-base for identifying in not more than five successive trials, the threshold round-trip transmission rate out of 24 possible candidates. Obviously, combinations of binary section with linear downstepping to arrive within a certain region of the final value and onto the threshold value can also be derived. FIGS. 4a and 4b show the ORIGINATOR FSM and RESPONDER FSM which correspond to the above binary section search method. An inspection of these figures will show that the only essential difference between FIGS. 4a and 4b and FIGS. 2a and 2b resides in the selection of the test frequencies. Otherwise, the basic adaptation methods are identical.

Figure 5:
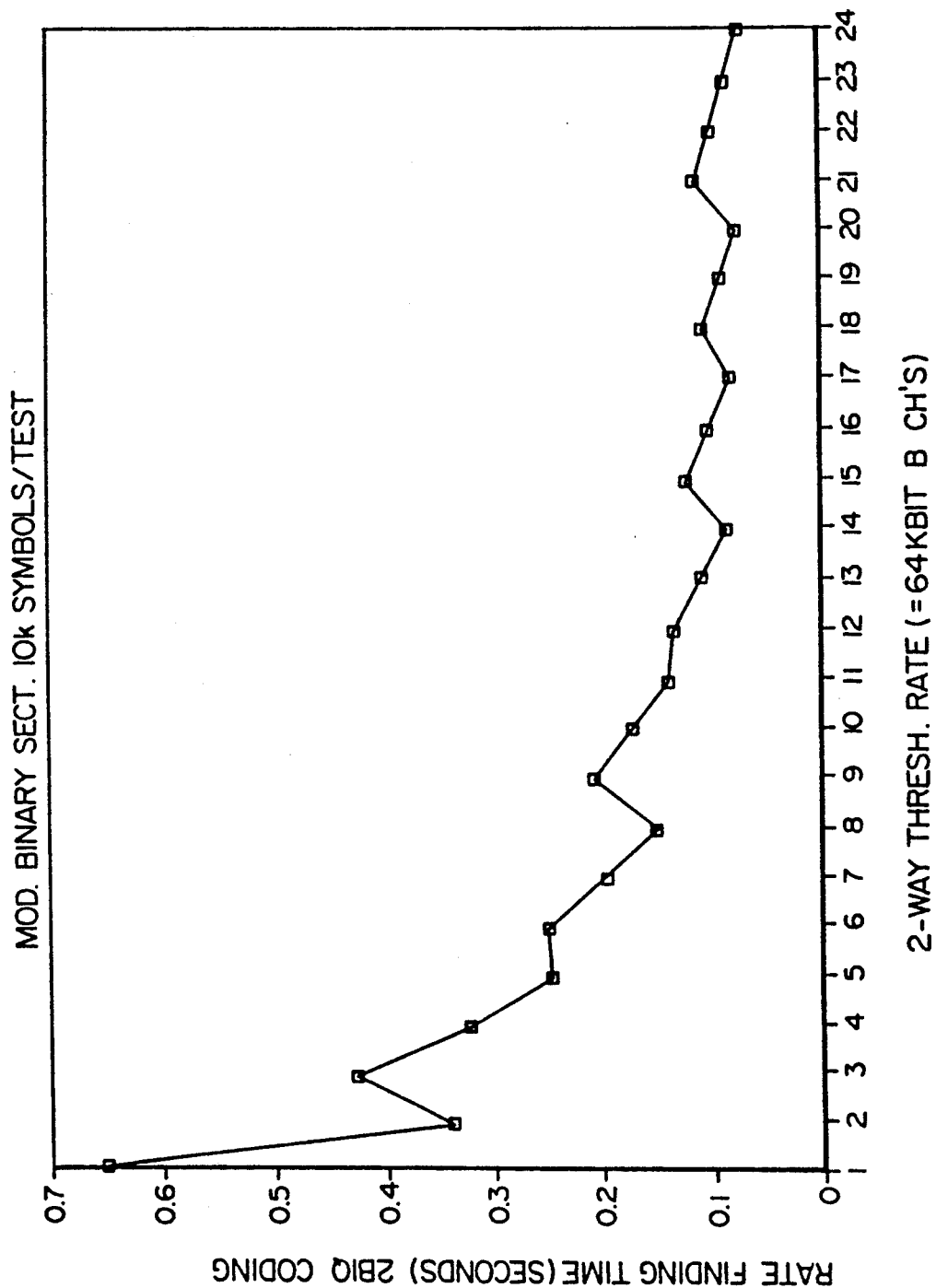
FIG. 5 is a graph of transmission rate finding time as a function of two-way transmission rate expressed in B channels for a Binary Section frequency search.

An advantage of the binary section search method is speed. FIG. 5 illustrates the convergence times for the binary section search as a function of the round-trip threshold rate in number of 64 kb/s channels. This calculation sums the absolute time spent at each node as the search tree is travelled out to each value on the abscissa assuming that a waiting time expressed as a constant number of symbols (10,000 is used) for the dwell on each candidate rate and that 2B1Q encoding is used for a line symbol rate of 32 k symbols/sec for each 64 kb/s of binary information. Using a constant number of symbols as the test time, waiting criteria accounts for the 1/x - like drop off in total searching time for the higher frequency solutions. If a constant real time waiting criterion is used, the result would be much more uniform, around approximately four times the basic test dwell interval. Either type of criteria can be used depending on what is known about the characteristics of the underlying physical transceiver circuits; particularly receive equalizers, clock recoverie and frame finding.

Circuit 10 of the present invention interacts with higher level functions to command an initial adaptation, check on operating margin, or to trigger possible re-adaptations. Whether the circuit is housed on a card in a PBX, or in its own customer-premises box, the adaptation process is not intended to be continuously operating but is to be conducted only in response to an external request to do so for maintenance, monitoring or installation purposes. In many applications, the adaptation process may often be run just at installation time or after loop properties have been deliberately improved by line conditioning efforts. A request to the interface circuit to activate its adaptation mode would have the following general form:

boot_trunk (X{dB}, <nmax{channels}>)

where:
  boot_trunk is the operational-code for this operation;
  X {db} is the reserve transmission margin that is given as a constraint to which the capacity-maximization process is subject (i.e. the number of channels found must still provide X dB reserve power margin on the link); and
  nmax is an optional parameter explicitly placing a limit on the maximum number of channels for the adaptation process to consider.

The result of the process is reported to the higher applications or the user interface panel, along line 56, prior to commencing NORMAL operation. The general form is:

turbo_result (error_code, nchannels, margin, time)

where:
  error_code is a field which would indicate the following general types of outcome;
    0—successful operation, Y db margin, maximum capacity obtained {nmax not specified}
    1—successful operation, Y db margin, nmax channels obtained as requested;
    2—successful operation, Y db margin, max. capacity less than requested nmax;
    3—loop operating at 1B+D only, limit={upstream, downstream, equal};
    4—error, no satisfactory operating rate found;
  nchannels is the number of B channels available;
  Y is the actual margin remaining after the capacity maximizing operation. Y may be different than X, the specified minimum margin, but will not be less than X dB; and
  Time is the elapsed time of the adaptation process. (Expected to be possibly up to a few seconds with present equalizer convergence times.)

After initial installation, the adaptation process could be re-run periodically to check on the un-allocated transmission margin on the link, or when loop characteristics have changed and more obtainable capacity is expected by re-running the adaptation process, or when service levels to a subscriber or remote premises site change such as to reduce or increase the number of B channels required or paid for, or during short periods of time when a subscriber needs more capacity, providing a simple form of "bandwidth on demand" service over existing copper loop plant.

In the example of a PBX application where the system provides an entire group of trunks back to the CO over a single pair, the adaptation process would not be used on a call-by-call basis but rather only by request from the PBX Operating System (OS) for maintenance or monitoring purposes. For example, it might be appropriate for the PBX to re-run the process at midnight once a day or once a week, as experience dictates, to verify the transmission margin. In an apartment building application, a simple LED interface would allow the installer to command the adaptation process, check the results, and configure the internal multiplex/demultiplex terminations accordingly. Thereafter, the process can be periodically scheduled from the CO to run during an instance when no calls are in progress. Alternatively, the remote end may be polled via the D-channel for periodic confirmation of the link margin without executing the whole adaptation process. When the intent is to confirm the self-engineered transmission margin of the interface circuit without attempting to increase capacity, a local receive margin measurement can be requested directly while in service with no effect on traffic with a separate operation by a command having the following form:

Check_margin{pseudo-BER}

This operation would simply return a current measurement of the internal eye-opening margin taken with the specified pseudo-BER offset (as described using an eye-opening monitor).

In PBX applications where the customer owns the PBX, the present invention allows the customer to perform some interesting trade-offs to suit his own judgement. For instance, a PBX could be made to support segregation of services onto two different optimized loops; one for data, one for voice, depending on user-specified usage patterns and quality requirements on the short connection to the CO, after which normal network quality will take over. The voice-carrying access link may be aggressively maximized for voice, with a minimum of reserved margin, since voice is highly immune to bit errors. On the other hand, the data pair may be maximized with a much larger reserve margin to guarantee data-grade BERs. Likewise, a PBX which shares voice and data over a single loop may decide to reduce reserve margin at night, when crosstalk may be lower, to obtain more B channels for overnight bulk database transfers.

In all such PBX-access applications, the interface to the regular network is simple and standard: each B channel or 2B channel pair is separated at the CO end loop equipment, D channel messages pertaining to that channel are placed in a new D channel appearance created at the CO end of the link and handled as normal 2B+D ISDN call appearances to the standard CO switching equipment. In other words, the CO end of the system which is designed for multi-line apartment or business premises services or PBX access trunking would be arranged so that the CO equipment does not know that the system is not simply a number of physically separate and real standard ISDN access pairs.

The following are constraints which should be placed in the protocol parameters with respect to the characteristics of the physical circuit implementations for the receiver and the characteristics of the maximum desired specifications of subscriber loop length. The key design parameters are p(x): the pdf of receiver acquisition time, which may be approximated by a mean $E(x)$ and variance $S^2$, and A(lmax): the propagation delay of maximum length loop.

The constraint on timer1 is:

$$\text{timer1} > 2(E(x) + k_1 * S + A(\text{lmax}))$$

Timer1 is the basic ORIGINATOR mode timer that sets the frequency downstepping period in the hunt for the highest safe operating rate. If timer1 is not suitably long with respect to the actual receiver acquisition times encountered so that acquisition times longer than $k_1*S$ occur during the process, a fairly benign type of failure can occur in the protocol in which the ORIGINATOR may downstep in frequency one or more times more than is strictly necessary. This results in a safe but slightly sub-optimal loop adaptation, with both ends in step but at a rate lower than is theoretically viable. In practice it may be advantageous to trade-off a smaller timer1 value against the probability of slightly excess downstepping because timer1 dominates the overall adaptation time because it paces the main iterative loop of the adaptation process.

By comparison, timer2 and timer3 have less influence on total adaptation time and yet more severe consequences arise from timer2 or timer3 related failures. Therefore, timer2 and timer3 can be given more margin than timer1. On the other hand, if timer1 is dramatically too short, the protocol will downstep to one or even zero B channels and deduce that there is no transmission possibe at all on a given loop, reporting this finding to external exception handling routines. In any given application, it is always possible to check on the adequacy of timer1 through two successive runs (perhaps only at commissioning time) using the nominal design timer1 value and say 1.5 times timer1 and asking for all channels that can be obtained. If both adaptation runs return with the same resultant B channels one can assume that timer1 is suitably long to avoid sub-optimal channel maximization.

Timer3 is a RESPONDER-mode parameter that comes into play when the RESPONDER has just received the local RxOK indication and is seeking to verify when the ORIGINATOR has also obtained an RxOK and ceased downstepping. If the receive frequency counter at the RESPONDER remains unchanged in these condition over the duration of timer3, the RESPONDER interprets this as the end of ORIGINATOR downstepping. If timer3 is too long there is no hazard but if timer3 is too short an important error can occur wherein the RESPONDER assumes completion of the adaptation process while the ORIGINATOR is still frequency downstepping. If this were permitted to occur, the RESPONDER would return to the operating state and cooperate no further with the ORIGINATOR in trying to find a lower rate that is suitable for return transmission to the ORIGINATOR. This hazard can be eliminated however by ensuring that:

$$\text{timer3} > \text{timer1} + k_3 * S$$

Should the above occur, the error would still be noted by controller 30 because transmit and receive frequencies cannot be different when in NORMAL operation.

Timer2 is an ORIGINATOR-mode parameter used to simply avoid any upset due to inevitable short transients when the adaptation process has converged on an operating rate and the X-db attenuators are switched out to obtain the operating benefit of the margin which has been reserved by adaptation 'behind' the specified extra attenuation penalty. In the preferred implementation, the attenuators for both directions of transmission are switched in and out by whichever end operates as the ORIGINATOR. This is preferred because the end receiving the external boot-trunk command is the only end that can be passed a variable margin specification before any communication is established over the link and use variable attenuators to implement that margin in both directions. In an implementation where a constant margin-pad value is to be used, the switching in/out of pads can be split and be included in the RESPONDER protocol if this is of any other advantage. The verification of bidirectional performance after pad removal is done by verifying ORIGINATOR RxOK timer2 seconds after the pads are switched out. If for any unusual reason the switch to a higher power level disrupts the RESPONDER or ORIGINATOR permanently, the successful round trip propagation path required to produce ORIGINATOR RxOK will not be valid after the wait of timer2. In such a case recourse is made to an external exception handler, although in practice this would be a very rare occurrence indeed because few physical mechanisms in which adding margin to a link causes it to degrade are not usual in transmission. The theoretical constraint on timer2 is:

$$\text{timer2} > 2*(A(\text{lmax}) + \text{tAGC})$$

where
   tAGC = worst case settling time of an acquired receiver presented with a step increase in receive signal strength with no other changes in the signal. The step amount is the largest anticipated margin reservation in the system design.

Clearly, one approach to specifying timer2 that is safe (but possibly overly conservative) is to treat an AGC transient as equivalent to a complete signal acquisition event. In this case, one could use:

$$\text{timer2} \geq = \text{timer1}$$

Crosstalk may be considered from two viewpoints: (a) crosstalk effects on other systems by a system configured pursuant to the present invention and (b) increased susceptibility of a system configured pursuant to the present invention to crosstalk.

In general, a system configured pursuant to the present invention can have greater spectral occupancy than normal ISDN loops and this seems at first to be a major crosstalk concern. However, careful thought reveals that this in itself does not penalize other existing fixed-rate systems more than crosstalk from more systems of the same fixed-rate nature because the adaptation signals do not increase the power spectral density of the signal in the bands admitted by receivers of conventional systems designed for 2B+D or 23B+D any more than neighbouring systems of those same types.

That is to say that as long as any neighbouring conventional 2B+D or 23B+D system that has band-limiting filters to optimize them for their intended rates of operation (as is normally design practice) then such systems will experience no greater total interference than they would from neighbouring systems of their own type. In other words, the signals produced by the present invention spread energy into bands where crosstalk coupling increases, other properly designed systems should not be admitting any power from these bands into their receivers. In fact, if a system configured pursuant to the present invention emits the same total power as a standard 2B+D design, the total admitted interference may even be lower than from neighbouring systems of the same conventional type because a higher-than-normal transmission rate spreads a fixed power over a greater band for lower than normal average power spectral densities with the present invention.

Another partially mitigating factor is that if loop pairs are in binder groups of pairs that terminate together on a set of subscribers at the same approximate distance from the CO, then because it is on short loops which the method achieves higher than normal transmission rates, the normal loops adjacent to a high-rate loop will, by definition, have power levels which give relatively high transmission margin against crosstalk from any source.

While a system configured pursuant to the present invention will not cause greater interference in other systems, the interface circuit 10 itself will have to accept greater crosstalk interference bandwidth when it increases its operating rate simply due to the necessary increase of receiver noise bandwidth in a higher rate transmission system. This is unavoidable but it is addressed both by the adaptive nature of the interface and by the user-specifiable reserve power margin that is provided by the adaption process. If the case should arise where crosstalk levels (or even other sources of noise) increased during operation so that the BER suffered noticeably even with the given power margin, then it would be necessary to schedule a re-adaptation with a possibly greater margin reservation or a smaller maximum number of channels, or simply re-adapting with the same parameters but in the altered noise environment, which may result in a lower threshold rate. To avoid ever having to reduce offered capacity levels due to a rise in crosstalk during service lifetime, one would simply have to use an appropriately conservative initial value for reserve link margin based on projected worst-case full-cable conditions. Note that in general even if degradation occurs after initial adaptation, there would never be any need to wait until the quality of service to the customer was noticeably reduced. As long as an in-service BER monitoring criteria or eye-opening monitor circuit is employed, a convenient time for a re-adaptation can be scheduled in advance to occur automatically in the first few seconds after the next time when, by chance, no calls are being carried in the system.

It will be understood that various modifications and alterations may be made to the present invention without departing from the spirit of the present invention. For example, a large number of variations in the frequency searching strategy are possible without departing from the basic methods described earlier. The invention contemplates linear upstepping wherein frequency stepping from one or two working channels up towards a channel at which round trip transmission fails, then stepping back down one channel, any of the methods described above where the size of the step is changed during the search, a random sequence of successive test frequencies, in an exhaustive test of all possible frequencies to build a table of pass-fail results. The last mentioned approach is ultimately the most robust as it can function to find the highest safe operating rate over an arbitrary transmission path should a case be known which does not even exhibit a monotonic decreasing dependency of transmission margin against transmission rate.

This invention also contemplates a variation wherein each end is initially in communications with each other at some normal rate, say 2B+D. Then through explicit inter-processor messaging in the D channel, they agree about a higher rate to be tested followed by a rendezvous back at 2B+D to conduct a "post mortem". For example, an entire frequency search protocol as outlined here could be emulated by successful iterations of (a) starting at 2B+D, (b) both "jumping" to transmit at a higher rate mB+D (at which time they are in general not able to communicate because it is not known if the loop works at mB+D), and (c) both returning after an agreed time at the mB+D rate to report if they could correctly receive from the other at the rate. After determining the threshold rate, both could then "jump" permanently back to the threshold rate and enter operation at that rate.

This approach is contemplated within this invention but is not the preferred approach due to requiring a greater total adaptation time while not at the same time giving any greater ease in the design of the physical subcircuits required to be operable over a wide range of frequencies. In particular, circuit 10 has all the same requirements even if the latter approach of direct intermediate D-channel data communications at a "base rate" is employed.

The invention also contemplates 2W or 4W operation. In 2W operation, the ORIGINATORs margin-reserving attenuator need only switch in the 2W section for both directions to receive the required margin reservation, i.e. only one or both attenuators may be employed as experience dictates to the designer.

A variation which may be advantageous in 2W operation wherein a limited amount of local transmit power is inevitably coupled through to the local receiver, is to replace all times when the RESPONDER presently sends no signal with times when it sends a representative signal into the line but which is deliberately constructed so the ORIGINATOR cannot possibly acquire RxOK under these circumstances (ie. contains no valid frame patterns or invalid coding). While for all purposes to the ORIGINATOR this is equivalent to receiving no signal at all, to the RESPONDER, it provides more realistic self interference effects for its local receiver to operate under. In 4W operation such a consideration does not apply but is also not hindered by universal substitution of a non-acquirable "dummy transmit signal" everywhere in the preceding description that the RESPONDER transmitter was idle. The ORIGINATOR transmitter is active with real signals throughout the relevant phases of the protocol and so this is not a consideration when operating in that mode.

The sizes of the adaptation step has been described in terms of 64 kb/s step sizes (B channels). It could alternatively be 16 kb/s steps (D channel unit sizes) or in general, any other agreed step size. Even non-uniform stepping sizes can be accommodated in the protocol because the RESPONDER transmits back to the ORIGINATOR at whatever frequency it receives from the ORIGINATOR, not at any pre-determined frequencies.

The invention also contemplates timer values which vary with the value of current transmit frequency/receive frequency such as in an implementation where, for example, the equalizer convergence time and/or clock acquisition time and/or BER measuring time all scale with the bit rate, i.e. require a given number of symbols rather than a given amount of actual time.

While the described embodiments include frequency flat attenuators, in which all frequencies passed through them undergo a constant loss, it is obvious that generalized filters which introduce both a flat loss and a frequency-selective loss and/or frequency selective phase-delay may also be used. The advantage of doing so would particularly appear in cases where it is known that significantly power-independent distortions limit transmission performance. In such cases one can encounter power-independent irreducible error rate floors and, if this is the case, an appropriate frequency selective margin reservation attenuator will give a better ability to predict the BER after adaptation and attenuator removal to enter the operating phase.

Nothing in the foregoing description limits the circuit or method of the present invention to operate only over the medium for which the invention was originally motivated, namely, a multi-gauge subscriber loop twisted pair with bridge taps. The method applies in principle to any other electromagnetic, continuous, simultaneous, two-way transmission medium, including free-space optical and fixed-station radio propagation, guided lightwave optical fibers and coaxial cable.

Furthermore, there are a number of applications to which the present invention could be applied. Indeed, a Digital Subscriber Interface circuit that automatically finds and operates at the highest reliable transmission rate possible over any given loop makes the following applications and services possible without undermining the basic obligation to provide 2B+D service to anyone within 5.5 km of a CO:

Direct multi-trunk homing of PBX's over a single twisted pair: Many business premises clustered in a city core will be well under 5.5 km from a CO and their actual twisted pair plant to the CO would have significantly greater bandwidth than required for 2B+D. The interface circuit of the present invention could find and report whatever the highest safe mB+D rate is for that loop and, if requested by the PBX, could configure the loop to operate at that capacity.

Multi-line POTS to apartment buildings: The Interface circuit of the present invention could be exploited as non-ISDN-service providing the maximum pair reuse for POTS application in downtown cores. Even if the customers in this context do not see ISDN service, this ISDN technology offers a telephone company a way of having a very small single-pair remote concentrator controlled from the CO over the D-channel.

Long Reach 1B+D minimal service: Subscribers over 5.5 km from a CO or subscribers within 5.5 km but having, for whatever reason, pathological loop characteristics could in some cases be given at least 1B+D service with the present invention. Because the interface circuit does its best on any given loop, it will automatically back off to a 1B+D or even a 1D(16 kb/s) solution if necessary for the longest or worst case loops assuming digital service can be given at all. In applications below 5.5 km, this provides for automatic detection of problem loops for the telephone company and provides a minimal service until the problem can be fixed to give 2B+D or more. It also gives the telephone company at least some capability to serve long-reach customers with ISDN.

Immediate Rewards for Loop Conditioning: For basic ISDN services, the intent is not to have to condition the loop plant at all, i.e hunting down and removing bridge taps. However, with a ISDN transmission technology according to the present invention, telephone companies would be in a position to charge for loop conditioning requests directly from customers because business customers may be willing to pay for loop conditioning if they know it will increase their number of B channels without requiring additional plant installation. Perhaps more realistically, the telephone companies may make their own decisions to invest in conditioning of certain loops to deliberately increase the loop capacity in circumstances where the customer has offered to pay for the extra channels.

Private Networks: Contemporary ISDN VLSI and interface cards permit private corporate networks to acquire only 2B+D on each twisted pair, even if they are brand-new low-cap pairs with no taps, perfect pair integrity and lengths well under 5.5 km. The interface circuit of the present invention would get as much capacity out of these pairs as the automatic rate maximizing process can safely achieve.

Stat Mux Private Applications: In these applications, it is envisaged that the method and circuit of the present invention are used solely in a private cross-campus environment where it is desired to maximize the transmission rate made available to a statistical multiplexer. A typical application would be where a number of computer terminals in one building of a university are desired to be connected, for data communications only (no voice), to a host computer or packet network communications network interface or other centralized data processing equipment, and it is desired to use only the twisted pair conductors that already exist in the campus wiring. In this application, the present invention allows maximum use of the existing cables while normal use of ISDN or other data communications technology would commit to a possibly less efficient standard fixed capacity such as 2B+D (160 kb/s) or 9600 b/s etc. with conventional modems.

The embodiments of the invention in which an exclusive property of privilege is claimed are defined as follows:

1. An interface circuit for use in a multi-channel, continuous, baseband transmission system in which communication signals may be transmitted bidirectionally over a communications link between two stations of said system, said interface circuit comprising:
   receiver means, having a receiver input and a receiver output, for delivering a signal applied to said receiver input to said receiver output, said receiver means including means responsive to a signal applied to said receiver input for generating a "signal present" output signal and means for acquiring a signal applied to said receiver input and generating a "signal acquired" signal; said means for acquiring including an adaptive equalizer circuit means for receiving and converging on a signal applied to said receiver input, signal evaluation circuit means for subjecting a signal delivered thereto by said equalizer circuit means to predetermined criteria and producing said "signal acquired" signal when said criteria are satisfied, and clock recovery circuit means for determining the clock of a signal applied to said receiver input and delivering said clock to said equalizer circuit means and said evaluation circuit means;

transmitter means, having a transmitter input and a transmitter output, for delivering a signal received at said transmitter input to said transmitter output for transmission along said link to said other station; and control means for controlling the mode of operation of said interface circuit wherein said interface circuit is operable in a NORMAL mode in which signals applied to said transmitter input are delivered by said transmitter means to said transmitter output for transmission along said link to said other station and signals received from said link at said receiver input and acquired by said receiver means are delivered to said receiver output, said receiver output delivering the "signal present" output signal and the "signal acquired" signal to said control means; and wherein said interface circuit is operable in a transmission rate ADAPTATION mode in which, in response to a first predetermined condition, said control means is operable to initiate a transmission rate testing process and subsequent thereto to restore said interface circuit for operation in said NORMAL mode of operation at the highest operable, bi-directional transmission rate determined pursuant to said testing process, or, in response to a second predetermined condition, said control means is responsive to a transmission rate testing process initiated at said other station and subsequent thereto to restore said interface circuit for operation in said NORMAL mode of operation at the highest operable, bi-directional transmission rate determined pursuant to said testing process.

2. An interface circuit as defined in claim 1, said receiver means further including a programmable demultiplexer for demultiplexing a signal acquired by said signal evaluation circuit means.

3. An interface circuit as defined in claim 1, said receiver means further including a switched variable attenuator operable under the control of said control means for attenuating a signal applied to said receiver input.

4. An interface circuit as defined in claim 1, said receiver means further including means for determining the currently received transmission rate.

5. An interface circuit as defined in claim 1, said receiver means further including a programmable demultiplexer for demultiplexing a signal acquired by said signal evaluation circuit means.

6. An interface circuit as defined in claim 5, said receiver means further including a switched variable attenuator operable under the control of said control means for attenuating a signal applied to said receiver input.

7. An interface circuit as defined in claim 6, said receiver means further including a rate counter or rate analyzer for determining the currently received transmission rate.

8. An interface circuit as defined in claim 1, said signal evaluation circuit means being a regenerator, framing and BER logic circuit.

9. An interface circuit for use in a multi-channel, continuous, baseband transmission system in which communication signals may be transmitted bi-directionally over a communications link between two stations of said system, said interface circuit comprising:

control means for controlling the mode of operation of said interface circuit;

receiver means, having a receiver input and a receiver output, for delivering a signal applied to said receiver input to said receiver output, said receiver means including automatic gain control means responsive to a signal applied to said receiver input for delivering a "signal present" output signal to said control means, means for acquiring a signal applied to said receiver input and delivering a "signal acquired" signal to said control means, said means for acquiring including adaptive equalizer circuit means for receiving and converging on a signal applied to said receiver input, signal evaluation circuit means including a regenerator, framing and BER logic circuit for subjecting a signal delivered thereto by said equalizer circuit means to predetermined criteria and producing said "signal acquired" signal when said criteria are satisfied, clock recovery circuit means for determining the clock of a signal applied to said receiver input and delivering said clock to said equalizer circuit means and said evaluation circuit means, a programmable demultiplexer for demultiplexing a signal acquired by said signal evaluation circuit means, a switched variable attenuator for attenuating a signal applied to said receiver input, and means for determining the currently received transmission rate;

transmitter means, having a transmitter input and a transmitter output, for delivering a signal received at said transmitter input to said transmitter output for transmission along said link to said other station, said transmitter means including a controllable output attenuator operable under the control of said control means for attenuating a signal transmitted by said transmitter means, transmit encoding logic means and line driving circuit means operable over a range of transmission rates, a pattern generator for producing test signals, a programmable input multiplexer for delivering to said transmitter circuit means a signal to be transmitted over said link; and wherein said interface circuit is operable in a NORMAL mode in which signals applied to said transmitter input by said multiplexer are delivered by said transmitter means to said transmitter output for transmission along said link to said other station and signals received from said link at said receiver input and acquired by said receiver means are delivered from said receiver output to said demultiplexer; and wherein said interface circuit is operable in a transmission rate ADAPTATION mode in which, in response to an adaptation signal applied to said control means, said control means is operable to initiate a transmission rate testing process including transmitting a series of test signals, each said test signals having a unique transmission rate selected from a range of transmission rates and being transmitted for a period of predetermined duration and, after each said period, determine whether a "signal acquired" signal has been from said receiver means, and subsequent thereto to restore said interface circuit for operation in said NORMAL mode of operation at the highest operable, bi-directional transmission rate determined pursuant to said testing process, or, in response to a "no signal" condition of predetermined duration at said receiver input followed by a "signal present" signal and a change in received signal transmission rate, said control means is responsive to a transmission rate testing process by causing said transmitter means to transmit a valid data sequence at the same frequency as that of a currently received test signal as long as said currently received test signal is present at said receiver input and subsequent thereto to restore said interface circuit for operation in said NORMAL mode of operation at the highest operable, bi-directional transmission rate determined pursuant to said testing process.

10. A method for determining the highest, common bi-directional transmission rate between two stations of an ISDN communications link, said method comprising the steps of:

(a) terminating communications between said stations for a first predetermined time interval;

(b) selecting a unique candidate transmission rate from a predetermined range of candidate transmission rates in accordance with an algorithm;

(c) transmitting a test signal at said candidate transmission rate for a second predetermined time interval from one of said stations, through an output attenuator at said one station, along a transmit path in said link to the other of said stations;

(d) while said test signal is being correctly received at said other station, storing the current candidate transmission rate at said second station, and transmitting a return signal at said candidate transmission rate from said other station, along a return path of said link, through an input attenuator at said one station and to said one station;

(e) determining whether a return signal at said candidate transmission rate has been correctly received at said one station within said second predetermined time interval;

(f) repeating steps (b), (c), (d) and (e) when a return signal has not been received within said first time interval, otherwise, performing a verification step including removing said output and input attenuators, re-transmitting a test signal in connection with which a return signal was correctly received at said one station within said first time interval, and waiting a further time interval for a verified return signal transmitted from said other station to said one station;

(g) transmitting a verified return signal from said second station to said first station when both said test signal is correctly received at said second station and the stored current candidate transmission rate remains unchanged during successive predetermined third time intervals;

(h) repeating steps (b), (c), (d), (e), and (f) until predetermined criteria have been satisfied; and (i) storing at each said station the highest candidate transmission rate for which a return signal at that rate was correctly received at said one station within said first time interval for subsequently transmitting normal communications on said communications link at said rate.

11. A method as defined in claim 10, wherein said first transmission rate is the highest possible transmission rate capable of being transmitted on said link.

12. A method as defined in claim 11, wherein the rate of each said additional signal is less than that of its immediately preceding test signal by a predetermined quantity.

13. A method as defined in claim 10, further including the step of terminating said transmitting steps as soon as a first verified return signal is received at said one station.

14. A method as defined in claim 10, said algorithm being a linear downstepping algorithm wherein the first selected transmission rate is the highest transmission rate possible on said link and each subsequent transmission rate is reduced from an immediately preceding transmission rate by a predetermined quantity.

15. A method as defined in claim 10, said algorithm being a linear upstepping algorithm wherein the first selected transmission rate is the lowest transmission rate possible on said link and each subsequent selected transmission rate is increased over an immediately preceding selected transmission rate by a predetermined amount up a maximum transmission rate.

16. A method as defined in claim 10, said algorithm being a modified binary section search algorithm.

17. A method as defined in claim 10, said algorithm being a random sequence of successive test transmission rates.

18. A method as defined in claim 10, said algorithm being a test of all possible transmission rates and the building of a table of successful and unsuccessful results.

* * * * *